Jan. 27, 1942. B. C. BOULTON ET AL 2,271,059
AIRCRAFT CONSTRUCTION
Filed April 21, 1938 2 Sheets—Sheet 1
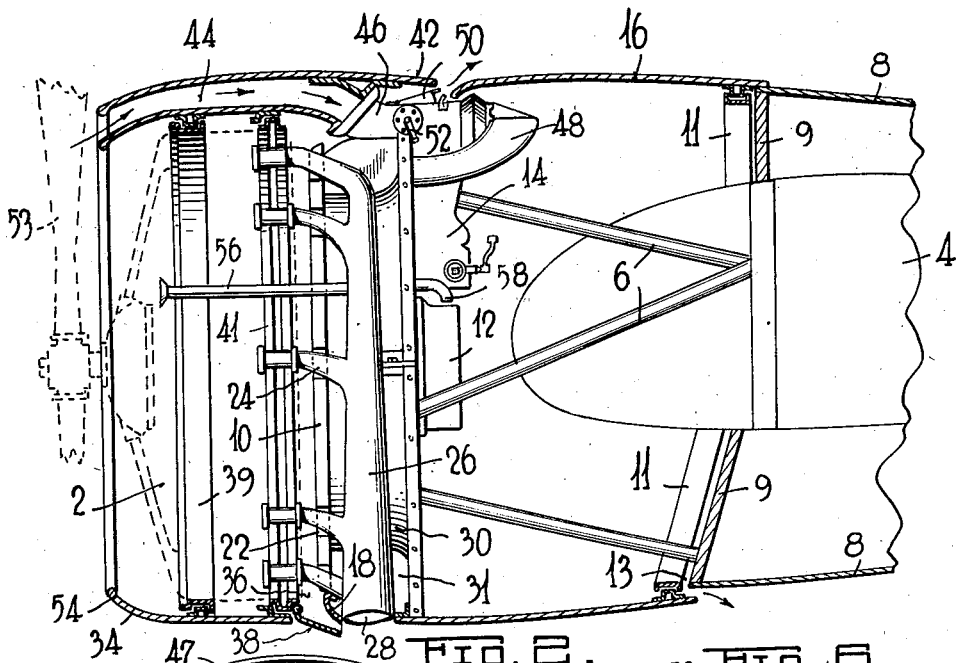
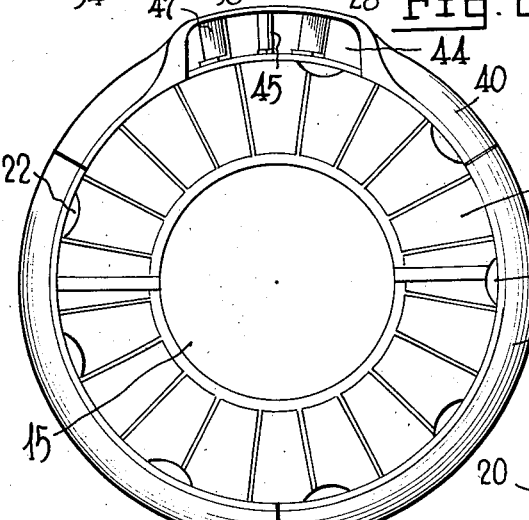
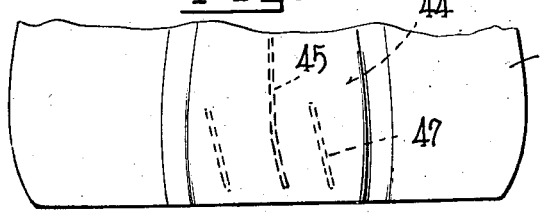
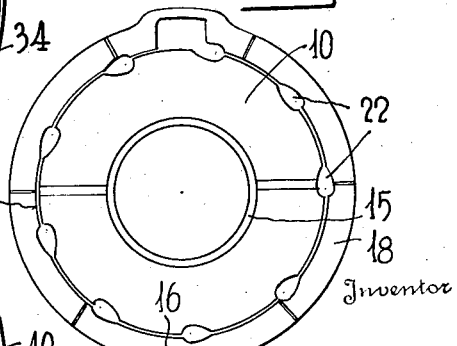
Inventor
BERTHOUD C. BOULTON
CLIFFORD E. ROBERTS
Attorneys Jan. 27, 1942.　　B. C. BOULTON ET AL　　2,271,059
AIRCRAFT CONSTRUCTION
Filed April 21, 1938　　2 Sheets-Sheet 2
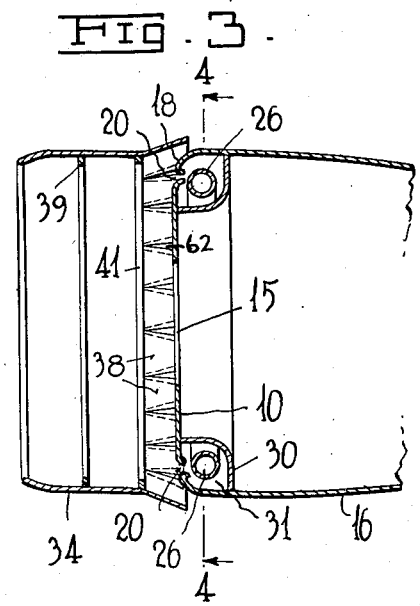
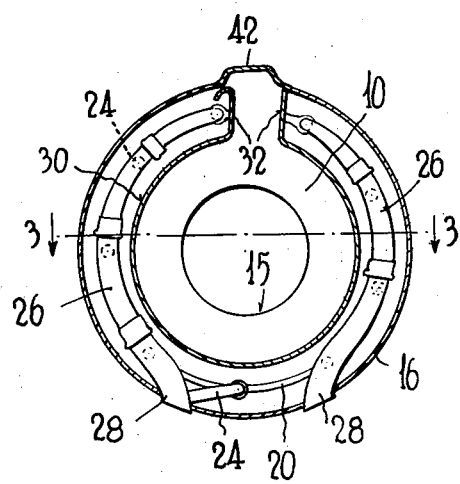
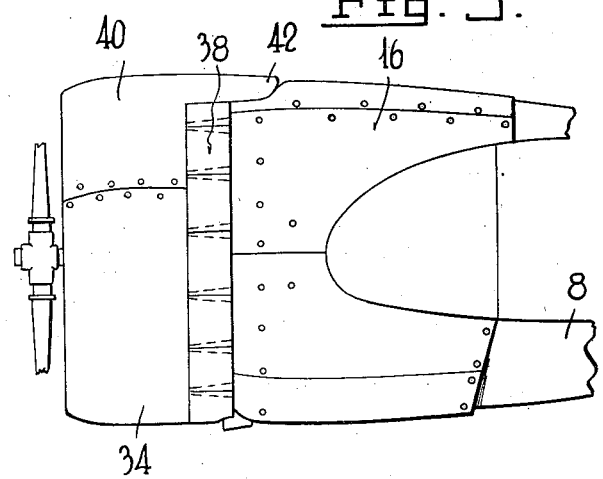
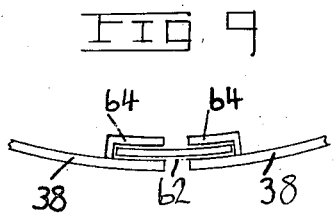
INVENTOR.
BERTHOUD C. BOULTON
BY CLIFFORD E. ROBERTS
ATTORNEYS Patented Jan. 27, 1942

2,271,059

UNITED STATES PATENT OFFICE 2,271,059

AIRCRAFT CONSTRUCTION

Berthoud C. Boulton, Towson, and Clifford E. Roberts, Joppa, Md., assignors to The Glenn L. Martin Company, Baltimore, Md.

Application April 21, 1938, Serial No. 203,370

4 Claims. (Cl. 123—171)

The invention relates to aircraft construction, and, more particularly, to a cowling arrangement designed to provide improved engine cooling for air-cooled radial engines.

In the past, difficulties have often been experienced with the proper cooling of aircraft engines. It has often been considered necessary to enclose such engines in a cowling having its front edge turned in sharply. The primary object of the invention is to improve the cooling of such engines, this being accomplished particularly by the fact that the front edge of the cowling is only slightly turned in and that the engine cylinders are practically completely exposed to a direct flow of air from the front.

It has also been customary in connection with the cowlings of aircraft engines to provide adjustable flaps at some point along the cowling, generally near the rear end thereof, adjacent to or behind the front edge of the wing on which the cowling is mounted, or at any rate, at a point behind the greatest diameter of the cowling and substantially behind the rear plane of the engine cylinders. We have discovered that greatly improved cooling can be obtained by locating the flaps at the point of fastest boundary flow of air around the cowling; that is to say, generally, at the point of greatest diameter of the cowling. This point is also preferably located substantially in transverse alignment with the rear plane of the engine cylinders. A second object of the invention, therefore, is to provide improved cooling by such an arrangement.

According to a further feature of the invention, the exhaust outlet of the engine is located behind, and preferably close to, the flaps.

A further object of the invention is to improve the cooling effect by extending the cowling well forward of the front edge of the motor. For this purpose the cowl preferably is so arranged that it practically fairs with the propeller. In other words, the propeller moves at only a very slight distance in front of the cowl. Of course, in the case of a variable pitch propeller, this slight space must be provided in the extreme pitch position thereof.

Still another object of the invention is to provide a novel and effective feed of air to the carburetor of the engine by a direct ramming action. In the past the feed of air has generally been produced by ramming through a passage of considerable curvature, which reduces the effective force of the air and thus prevents satisfactory operation. According to the present invention, the air passage is almost straight.

A further object of the invention is to locate the air inlet in a region where the action of the propeller is more satisfactory for forcing the air to the carburetor. In the past, it has been customary to locate such air ducts fairly close to the center of the propeller, whereas according to the present invention, the air duct is located at some distance away from the center where the propeller will be effective in forcing the air into the duct therefor.

Another purpose of the invention is to provide a novel mounting for the hood which surrounds the engine cylinders and for the flaps. This mounting is simple and sturdy, and the hood is mounted as a unit so that stresses likely to cause fatigue failures are avoided. According to the invention, this is accomplished by mounting the parts of the hood on rings secured to the rocker arm boxes of the engine, the flaps being mounted on one of these rings independently of the hood.

A further object of the invention is to provide an arrangement in which the exhaust is fully insulated from the cowling, but in which advantage may be taken of the heat of the exhaust to supply air to the carburetor at a high temperature. Particularly, the invention provides an arrangement of this type which, in contrast to devices heretofore used, sets up no back pressure on the engine.

Still another purpose of the invention is to provide a novel type of selective arrangement for feeding either hot or cool air to the carburetor, or a mixture thereof, so that the temperature of the air in the carburetor intake may be suitably controlled.

Further objects and advantages of the invention will appear more fully from the following description, particularly when taken in conjunction with the accompanying drawings which form a part thereof.

In the drawings:

Fig. 1 is a longitudinal vertical section through an aircraft engine installation embodying one form of the invention.

Fig. 2 is a front view of Fig. 1, with the engine omitted.

Fig. 3 is a horizontal cross section through the cowling and hood on the line 3—3 of Fig. 4.

Fig. 4 is a cross section on the line 4—4 of Fig. 3.

Fig. 5 is a side elevation of the cowling and hood embodying the invention.

Fig. 6 is a view of the selective valve control.

Fig. 7 is a front view of the cowling and muff.

Fig. 8 is a top plan view of the front of the hood.

Fig. 9 is a detail view of flap construction.

In the drawings, the invention is shown as applied to a radial aircraft engine 2 having nine cylinders, which is adapted to be mounted on the front of a wing 4, although it will be understood that the invention is in no manner limited either to the specific type of engine or to the position or manner in which it is mounted. Mounted on the wing 4 is a frame consisting of members 6 of known type for supporting the engine. Fairing members 8 are supported on the wing, and are located behind the cowling in such a manner as to fair it into the wing. A firewall 9 and ring 11 support the front of the fairing members 8 and the rear of the cowling sections 16, a space being provided therebetween at 13 for the escape of air from within the cowling.

Mounted on the frame members 6 is a plate 10 provided with a central opening 15 through which extends the crank case 12 of the engine, upon which are mounted some of the accessories such as the carburetor 14. The crank case fills the opening 15 in the center of plate 10.

Cowling sections 16 at their forward ends are turned inwardly as at 18 at a point to the rear of the engine cylinders. These cowl sections are combined to form a complete cowling around the engine accessories which extends between the hood, to be described below, and the fairing members 8.

Between the inwardly turned ends 18 of the cowl section 16 and the outer edges of the plate 10 is a small space indicated at 20. At various points such as 22 (Fig. 2) the space 20 is enlarged so as to provide openings great enough to permit the passage of the exhaust leads or pipes 24 of the engine. The exhaust leads 24 from the nine different cylinders are connected to two exhaust outlet pipes 26 terminating as at 28 through openings in the front parts of the cowling member 16 at the bottom of the cowling. Five of the exhaust outlets may be connected to one of the passages 26 while four are connected to the other as indicated in Fig. 4 in which the lowest exhaust pipe is connected to the left hand exhaust conduit 26.

A muff 30 is provided to enclose the exhaust pipes 26. This muff is secured, for example by snaps of well known structure, at one edge to cowl members 16 while along its other edge it is connected to the plate 10, thus forming an annular passage 31 around the outside of the cowling at the front end within which are arranged the two exhaust pipes 26. The space formed by member 30 is divided into two sections at the top by walls 32. Member 30 also blocks off the flow of air, entering the muff through space 20, from the hood into the cowl 16.

With the construction shown, it will be evident that the exhaust from the engine is discharged through two outlet pipes at the bottom of the front part of the cowling. The exhaust outlets are mounted within a chamber into which air can flow from the front through the space 20 so that the exhaust pipes will be kept cool and will be insulated by an air space from the cowling body.

In front of the cowling and around the motor is mounted a hood 34, formed in sections. This hood terminates adjacent the plane of the rear end of the engine cylinders, and as shown in the drawings is slightly in front of such plane. The hood is formed in three sections which are detachably mounted on rings 39, 41, these rings being directly supported by the rocker arm boxes of the engine. The hood is thus steadily supported. There is left between the rear end of the hood 34 and the front portions 18 of the cowling section 16 a space 36, the opening of which may be regulated by pivoted flaps 38 mounted on the rear hood supporting ring 41 and therefore independent of the hood. The position of these flaps may be controlled in any desired and conventional fashion. The flaps are located at the point of greatest cross section, or fastest surface air flow, of the whole engine installation. Thus the best cooling effect is assured. Furthermore, the exhaust outlets 28 are just to the rear of the flaps.

The top section 40 of the hood has a rearward extension 42, and within this portion is arranged an air passage 44, divided into two parts by a wall 45. Near the front of the passage are two deflecting members 47, arranged at a slight angle to the axis of the passage. The passage, as will be apparent from Fig. 1, is substantially straight, so that air can flow therethrough without substantial obstruction, and a highly desirable ramming effect for the air entering the carburetor is produced. Furthermore, the entrance to the passage is located opposite a portion of the propeller blade which has substantial width and pitch, so that the propeller adds to the force which drives the air into the passage. The air from the propeller has a direction of flow at a slight angle to the longitudinal axis of the passage 44, and deflecting members 47 are provided to straighten out the air stream.

This air passage 44 enters into a triple pipe section 46, which has a second branch leading to the carburetor 14 and a third branch connected through pipe 48 with the space 31 within muff 30. Located within this three-pipe section is also a controllable air-releasing member 50. Pivoted in the member 46 is a valve controlled by a member 52 and capable of occupying the three positions shown in broken lines in Fig. 6, so as to direct air from passage 44 to the carburetor while closing off passage 48, to direct air from passage 48 to the carburetor while closing off passage 44, or to permit air from both to flow to the carburetor. Obviously, the position of the valve may be varied so as to feed from both passages 44 and 48 but in varying amounts. In this manner hot air from muff chamber 31 which is heated by the exhaust pipes 26 may be fed to the carburetor as desired. The air heating means, however, produces no back pressure on the engine.

It will be noted that the front edge 54 of the hood 34 is only slightly turned in. The inner edge of this hood is substantially in alignment with the outer periphery of the engine cylinders, so that the cylinders are completely exposed to the direct flow of air into the hood. Furthermore, the hood extends forwardly farther than is usually the practice, and practically fairs with the propeller 53, leaving only a slight space therebetween. Of course, if the propeller is of the variable pitch type, this space must be provided in the extreme pitch position of the propeller.

An additional air tube 56 may also be provided terminating at 58 to the rear of the wall 10 for introducing air into the accessory compartment to cool the accessories therein.

In order to prevent spaces between the flaps 38 when they are swung out to open the space 36, we provide at the adjacent edges of the flaps members 64 (Fig. 9) forming grooves at such edges. Within these grooves are arranged non-abrasive closing plates 62, formed of any suitable rigid material which will slide over the metal of the flaps without causing undue wear. This material may be hard fibre board, micarta, or other substances. The plates 62 are preferably hinged at their inner ends to the ring 41.

While we have described herein one embodiment of our invention, we wish it to be understood that we do not intend to limit ourselves thereby except within the scope of the appended claims.

We claim:

1. In an aircraft, an engine, means for mounting said engine on the aircraft, a hood surrounding said engine, a cowling to the rear of said hood, a closure plate mounted to the rear of said engine and having its periphery spaced slightly from said cowling, means connected to said cowling and to said plate to enclose therewith a chamber into which such space forms an entrance, said cowling and hood being arranged to provide a space therebetween, and an exhaust pipe for said engine located within said chamber and extending to the outside of the cowling behind and adjacent to such space.

2. In combination with an engine, a hood and cowling assembly surrounding said engine and comprising a hood of rearwardly increasing cross section terminating adjacent the point of greatest cross section of the assembly and a cowling located to the rear of said hood, said cowling and hood providing a space therebeteween, and an exhaust outlet pipe located to the rear of said opening within said cowling.

3. In an aircraft, an engine, means for mounting said engine on the aircraft, a hood surrounding said engine, a cowling to the rear of said hood, a closure plate mounted to the rear of said engine and having its periphery spaced slightly from said cowling, means connected to said cowling and to said plate to enclose therewith a chamber into which such space forms an entrance, said cowling and hood being arranged to provide a space therebetween, and an exhaust pipe for said engine located within said chamber.

4. In an aircraft, an engine, means to mount the engine on an aircraft, a hood surrounding the engine and terminating adjacent the plane of the rear end of the engine cylinders, a cowl behind the hood, said cowl and hood providing a space therebetween, accessories for the engine within said cowl, and means closing off the interior of said cowl from the interior of said hood.

BERTHOUD C. BOULTON.
CLIFFORD E. ROBERTS.